United States Patent

Simmons et al.

(10) Patent No.: US 9,115,808 B2
(45) Date of Patent: Aug. 25, 2015

(54) TRANSITION PIECE SEAL ASSEMBLY FOR A TURBOMACHINE

(75) Inventors: Scott Robert Simmons, Simpsonville, SC (US); Ronald James Chila, Greenfield Center, NY (US)

(73) Assignee: General Electric Company, Schenectady, NY (US)

( * ) Notice: Subject to any disclaimer, the term of this patent is extended or adjusted under 35 U.S.C. 154(b) by 853 days.

(21) Appl. No.: 13/372,008

(22) Filed: Feb. 13, 2012

(65) Prior Publication Data

US 2013/0209250 A1 Aug. 15, 2013

(51) Int. Cl.
*F01D 9/02* (2006.01)
*F01D 25/24* (2006.01)
*F16J 15/08* (2006.01)

(52) U.S. Cl.
CPC .................................. *F16J 15/0887* (2013.01)

(58) Field of Classification Search
CPC ........... F01D 9/02; F01D 9/023; F01D 9/065; F01D 11/005; F01D 11/008; F01D 11/02; F01D 11/025
USPC ......... 415/134, 139, 136, 137, 138, 128, 230, 415/229; 416/248, 193 A; 277/647, 644, 277/626
See application file for complete search history.

(56) References Cited

U.S. PATENT DOCUMENTS

| | | | |
|---|---|---|---|
| 4,183,396 A * | 1/1980 | Kinast et al. | 165/9 |
| 4,465,284 A * | 8/1984 | Szema | 277/628 |
| 5,221,096 A * | 6/1993 | Heldreth et al. | 277/630 |
| 6,086,329 A * | 7/2000 | Tomita et al. | 416/193 A |
| 6,393,828 B1 * | 5/2002 | Zhao et al. | 60/39.37 |
| 6,547,257 B2 * | 4/2003 | Cromer | 277/630 |
| 2002/0121744 A1 * | 9/2002 | Aksit et al. | 277/411 |
| 2004/0031271 A1 * | 2/2004 | Jorgensen | 60/796 |
| 2004/0052637 A1 * | 3/2004 | Paprotna et al. | 415/170.1 |
| 2005/0082768 A1 * | 4/2005 | Iguchi et al. | 277/591 |
| 2006/0255549 A1 * | 11/2006 | Amos et al. | 277/644 |
| 2007/0212214 A1 * | 9/2007 | Paauwe | 415/170.1 |
| 2008/0166233 A1 * | 7/2008 | Johnson et al. | 415/230 |
| 2008/0202124 A1 * | 8/2008 | Sutcu et al. | 60/796 |
| 2008/0267768 A1 * | 10/2008 | Dakowski et al. | 415/115 |
| 2009/0072497 A1 * | 3/2009 | Kunitake et al. | 277/641 |
| 2009/0324387 A1 * | 12/2009 | Turaga | 415/115 |
| 2010/0011774 A1 * | 1/2010 | Johnson et al. | 60/752 |
| 2010/0054928 A1 * | 3/2010 | Schiavo | 415/182.1 |
| 2010/0247005 A1 * | 9/2010 | Aschenbruck et al. | 384/15 |
| 2010/0247286 A1 * | 9/2010 | Maldonado | 415/1 |
| 2011/0014029 A1 * | 1/2011 | Venkataraman et al. | 415/110 |
| 2011/0179798 A1 * | 7/2011 | Pieussergues et al. | 60/752 |

FOREIGN PATENT DOCUMENTS

| | | |
|---|---|---|
| DE | 102007062681 A1 | 6/2009 |
| EP | 1832716 A2 | 9/2007 |
| FR | 2937098 A1 | 4/2010 |

OTHER PUBLICATIONS

Search Report from EP Application No. 13154917.2 dated Nov. 28, 2013.

* cited by examiner

*Primary Examiner* — Dwayne J White
*Assistant Examiner* — Joshua R Beebe (57) ABSTRACT

A transition piece seal assembly includes a first seal, and a second seal joined to the first seal. The second seal being spaced from the first seal to define a coolant passage.

15 Claims, 8 Drawing Sheets

TRANSITION PIECE SEAL ASSEMBLY FOR A TURBOMACHINE

BACKGROUND OF THE INVENTION

The subject matter disclosed herein relates to the art of turbomachines and, more particularly, to a transition piece seal assembly for a turbomachine.

Many turbomachines include a compressor portion linked to a turbine portion through a common compressor/turbine shaft or rotor and a combustor assembly. The compressor portion guides a compressed airflow through a number of sequential stages toward the combustor assembly. In the combustor assembly, the compressed airflow mixes with a fuel to form a combustible mixture. The combustible mixture is combusted in the combustor assembly to form hot gases. The hot gases are guided to the turbine portion through a transition piece. The hot gases expand through the turbine portion along a hot gas path creating work that is output, for example, to power a generator, a pump, provide power to a vehicle such as an aircraft or the like. In addition to providing compressed air for combustion, a portion of the compressed airflow is passed through the turbine portion for cooling purposes.

A seal is provided between the transition piece and a first stage of the turbine portion. The seal reduces leakage of lower temperature gases from the compressor flowing into high temperature gasses passing to the turbine portion. As such the seal is exposed to hot gases flowing through the transition piece. The seal is also configured to accommodate relative expansions of the transition piece and the turbine portion. More specifically, the transition piece and the turbine portion are often formed from dissimilar materials. Accordingly, the transition piece and the turbine portion will experience different rates of expansion when exposed to the hot gases. The seal is configured to accommodate these different rates of expansion and still limit any escape of the hot gases.

BRIEF DESCRIPTION OF THE INVENTION

According to one aspect of the exemplary embodiment, a transition piece seal includes a first seal, and a second seal joined to the first seal. The second seal being spaced from the first seal to define a coolant passage.

According to another aspect of the exemplary embodiment, a transition piece seal assembly includes a first seal component including a first seal member joined to a second seal member. The first seal member includes a first end that extends to a second end through a substantially linear intermediate portion having a first edge that extends to a second edge. The second seal member includes a first end portion that extends to a second end portion through a substantially linear intermediate section having a first edge portion that extends to a second edge portion. The first edge portion is joined to the first edge of the first seal member. The second seal member is spaced from the first seal member to define a coolant passage. The seal assembly also includes a second seal component having a first seal element joined to a second seal element. The first seal element includes a first end that extends to a second end through a substantially linear intermediate portion having a first edge that extends to a second edge. The second seal element includes a first end section that extends to a second end section through a substantially curvilinear intermediate section that is joined to the intermediate portion of the first seal element.

According to yet another aspect of the exemplary embodiment, a turbomachine includes a turbine portion, a first transition piece fluidly connected to the turbine portion. The first transition piece includes an aft frame having an outer rail member, an inner rail member and first and second side rail members joining the outer and inner rail members. A second transition piece is fluidly connected to the turbine portion adjacent to the first transition piece. The second transition piece includes an aft frame having an outer rail element, an inner rail element, and first and second side rail elements joining the outer and inner rail elements. The first side rail element is joined to the second side rail member so as to establish a seal cavity. A first seal component is operatively connected between the turbine portion and the outer rail member. The first seal component includes a first seal member joined to a second seal member. The first seal member includes a first end that extends to a second end through a substantially linear intermediate portion having a first edge that extends to a second edge. The second seal member includes a first end portion that extends to a second end portion through a substantially linear intermediate section having a first edge portion that extends to a second edge portion. The first edge portion is joined to the first edge of the first seal member. The second seal member is spaced from the first seal member to define a coolant passage. A second seal component is arranged within the seal cavity. The second seal component includes a first seal element joined to a second seal element. The first seal element includes a first end that extends to a second end through a substantially linear intermediate portion having a first edge that extends to a second edge. The second seal element includes a first end section that extends to a second end section through a substantially curvilinear intermediate section that is joined to the intermediate portion of the first seal element.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
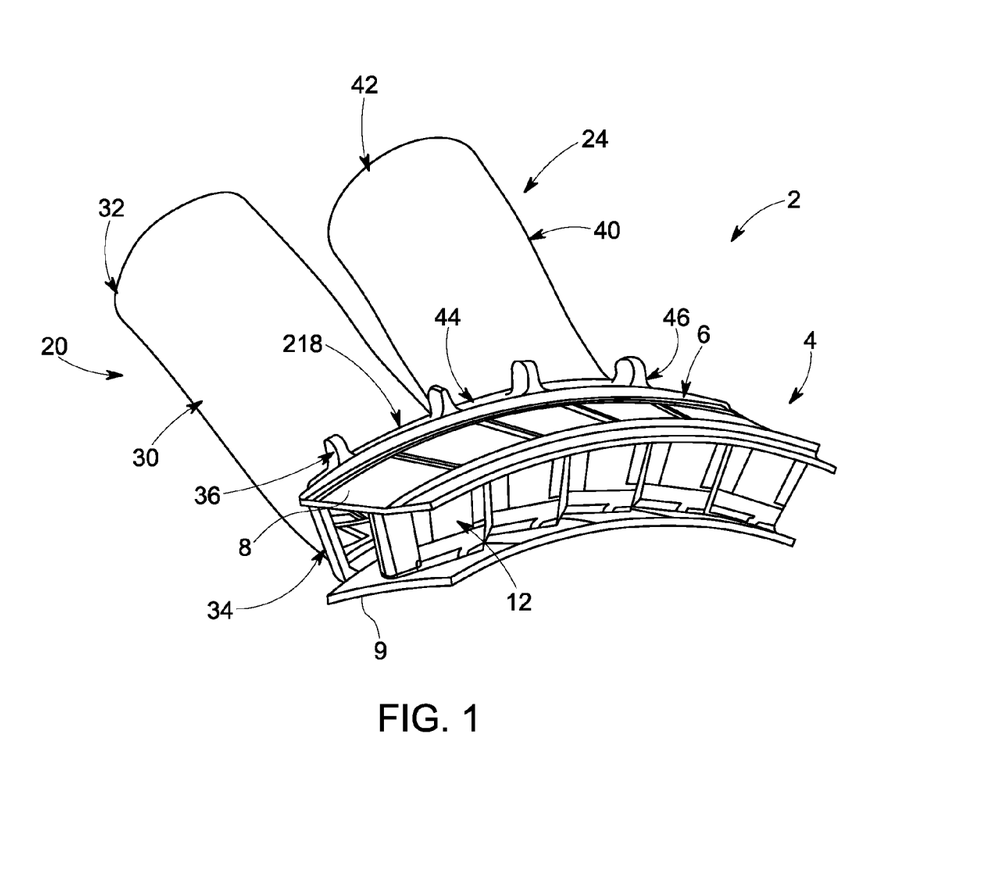
FIG. 1 is a partial perspective view of a portion of a turbomachine including a transition piece seal assembly in accordance with an exemplary embodiment.

A turbomachine in accordance with an exemplary embodiment is indicated generally at 2. Turbomachine 2 includes a turbine portion 4 having a turbine first stage 6. Turbine first stage 6 includes a first or outer shroud member 8 and a second or inner shroud member 9. A plurality of vanes or nozzles, one of which is indicated at 12, is arranged between outer and inner shroud members 8 and 9. Nozzles 12 guide hot gases toward first stage turbine blades (not shown). The hot gases expand through turbine portion 4 through subsequent stages (also not shown) to create work. The hot gases are produced in a plurality of combustor assemblies (not shown) connected to turbine first stage 6 through corresponding transition pieces, two of which are indicated at 20 and 24. Transition piece 20 includes a transition piece body 30 having a forward or inlet end 32 and an aft or outlet end 34. Outlet end 34 includes a first aft frame 36. Similarly, transition piece 24 includes a transition piece body 40 having a forward or inlet end 42 and an aft or outlet end 44. Outlet end 44 includes a second aft frame 46.

Figure 2:
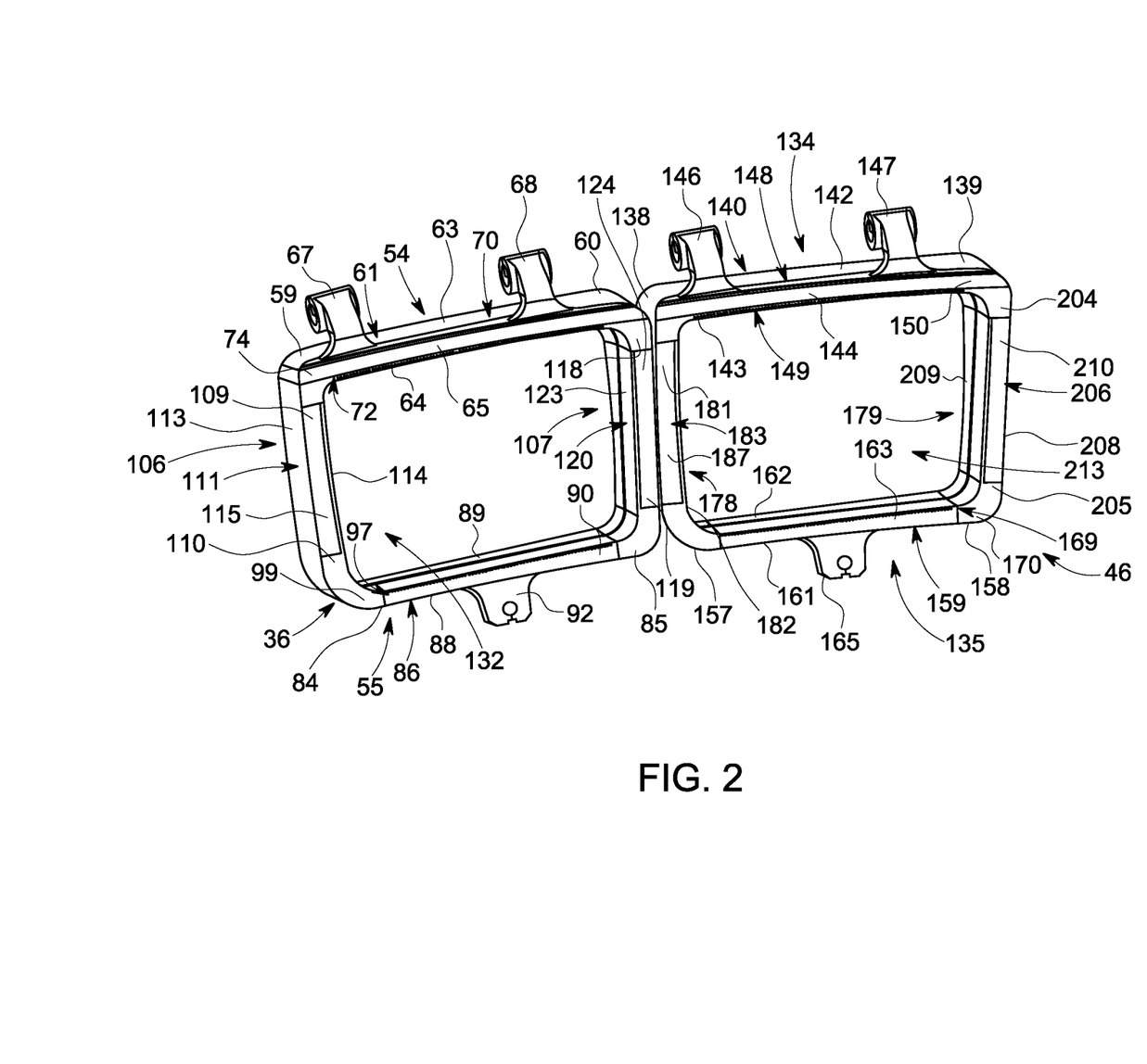
FIG. 2 is a partial perspective view of first and second transition piece aft frame portion of the turbomachine of FIG. 1.
Figure 3:
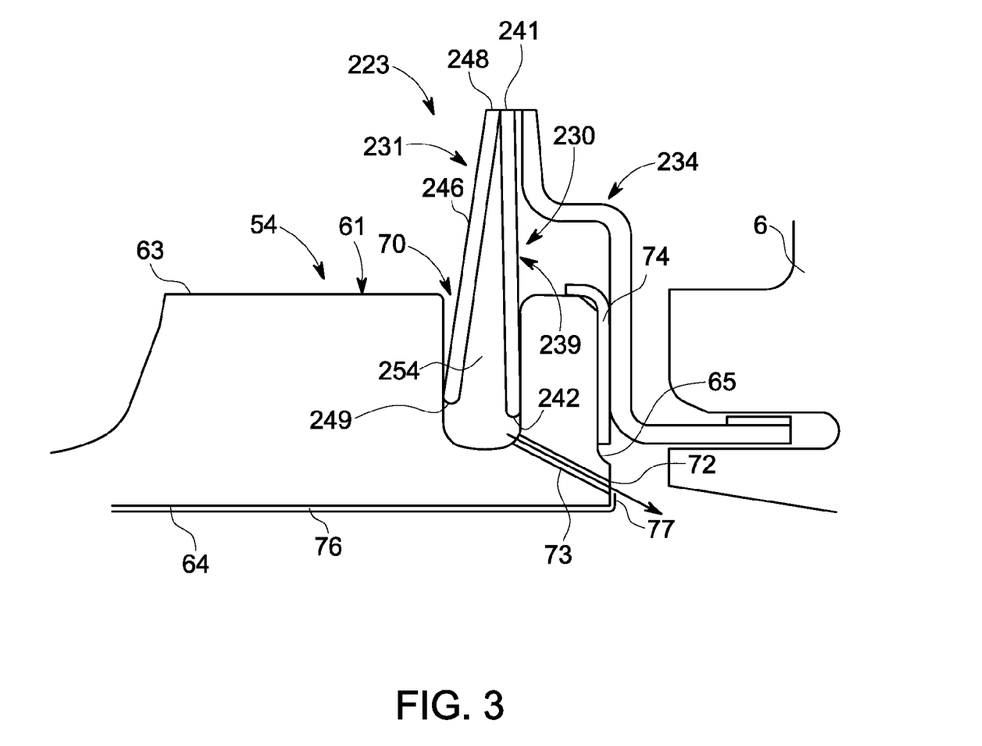
FIG. 3 is a plan view of an outer rail member of the first transition piece aft frame portion of FIG. 2.
Figure 4:
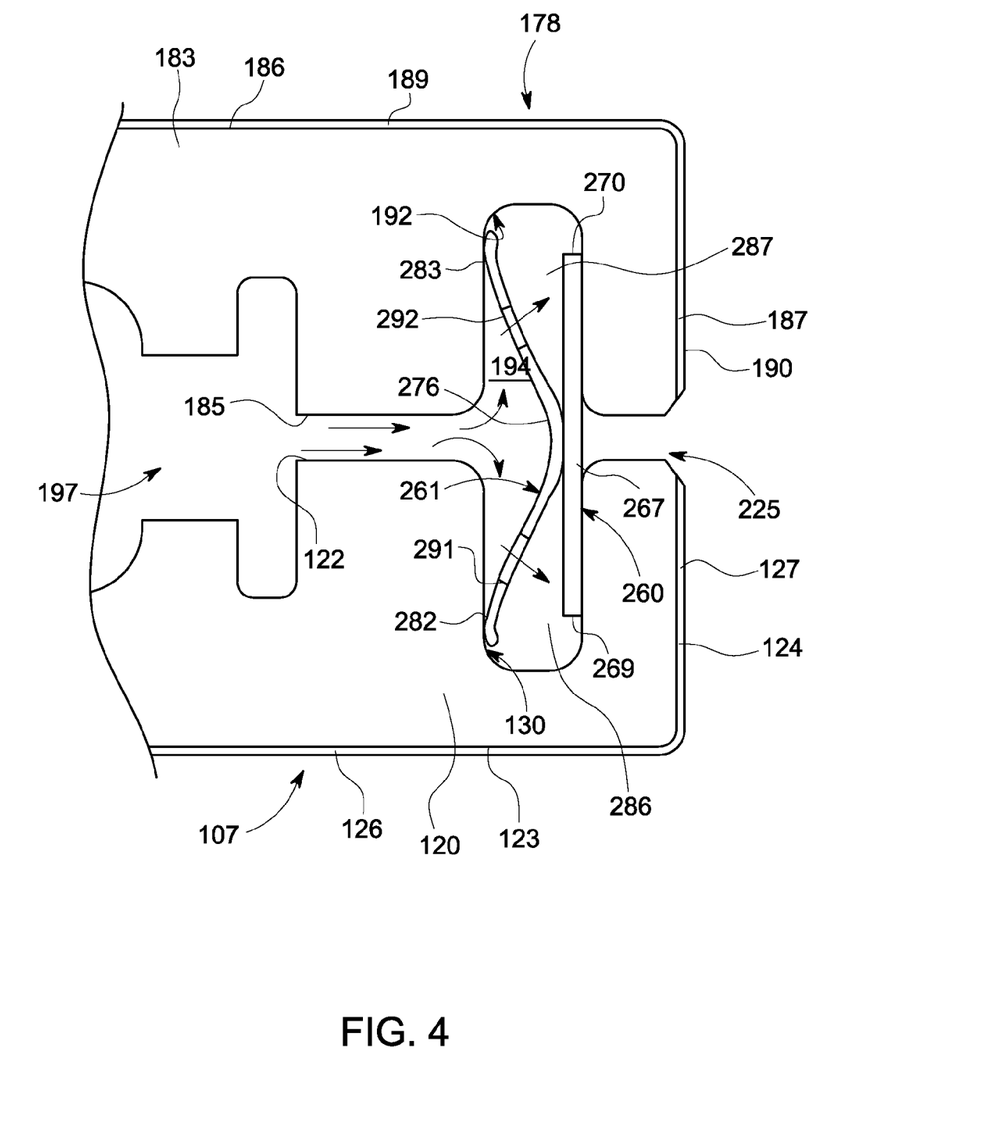
FIG. 4 is a plan view of a side rail member and a side rail element of the first and second aft frame portions of FIG. 2.

With reference to FIGS. 2-4, first aft frame 36 includes an outer rail member 54 and an inner rail member 55. Outer rail member 54 includes a first end 59 that extends to a second end 60 through an intermediate portion 61. Outer rail member 54 includes an outer surface 63 and an inner or gas path surface 64 that is exposed to hot gases flowing from a combustor assembly (not shown). Outer rail member 54 is also shown to include an aft face 65. Aft face 65 is positioned adjacent turbine first stage 6. Outer surface 63 includes first and second mounting members 67 and 68 that support aft frame 36 relative to turbine portion 2. Outer surface 63 also includes an outer seal slot 70. Aft face 65 includes a plurality of openings 72 that are fluidly connected to outer seal slot 70 by a corresponding plurality of channels, one of which is indicated at 73. Aft face 65 is also shown to include a sacrificial wear strip 74 that absorbs contacts from turbine first stage 6 to protect outer rail member 54 from damage. Finally, gas path surface 64 includes a thermal barrier ceramic (TBC) coating 76. A portion of aft face 65 is also provided with a TBC coating 77. TBC coating provides a thermal protective layer to transition piece surface exposed to hot combustion gases.

Inner rail member 55 includes a first end 84 that extends to a second end 85 through an intermediate portion 86. Inner rail member 55 includes an outer surface 88, an inner or gas path surface 89, and an aft face 90. Outer surface 88 includes a seal mounting member 92 as well as an inner seal slot (not shown). Aft face 90 includes a plurality of openings 97 that are fluidly connected to the inner seal slot through a plurality of passages (also not shown). Aft face 90 is also provided with a wear strip 99. Gas path surface 89 and a portion of aft face 90 are provided with a TBC coating (not separately labeled). Outer rail member 54 is joined to inner rail member 55 by first and second side rail members 106 and 107.

First side rail member 106 includes a first end 109 that joins with first end 59 of outer rail member 54 and a second end 110 that joins with first end 84 of inner rail member 55. An intermediate portion 111 extends between first and second ends 109 and 110 of first side rail member 106. First side rail member 106 also includes an outer surface 113, an inner or gas path surface 114, and an aft face 115. Similarly, second side rail member 107 includes a first end 118 that joins with second end 60 of outer rail member 54 and a second end 119 that joins with second end 85 of inner rail member 55. An intermediate portion 120 extends between first and second ends 118 and 119 of second side rail member 107. Second side rail member 107 also includes an outer surface 122, an inner or gas path surface 123, and an aft face 124. Gas path surface 123 and aft face 124 are shown to include corresponding TBC coatings 126 and 127. In accordance with an exemplary embodiment, outer surface 122 is provided with a channel 130. As shown, outer rail member 54, inner rail member 55, and first and second side rail members 106 and 107 combine to form an opening 132. Opening 132 provides a passage for combustion gases to pass from transition piece 20 to turbine first stage 6.

In further accordance with the embodiment shown, second aft frame 46 includes an outer rail element 134 and an inner rail element 135. Outer rail element 134 includes a first end 138 that extends to a second end 139 through an intermediate portion 140. Outer rail element 134 includes an outer surface 142 and an inner or gas path surface 143 that is exposed to hot gases flowing from a combustor assembly (not shown). Outer rail element 134 is also shown to include an aft face 144. Aft face 144 is positioned adjacent turbine first stage 6. Outer surface 142 includes first and second mounting members 146 and 147 that support aft frame 46 relative to turbine portion 2 and an outer seal slot 148. Aft face 144 includes a plurality of openings 149 that are fluidly connected to outer seal slot 148 by a corresponding plurality of channels (not shown). Aft face 144 is also shown to include a sacrificial wear strip 150 that absorbs contact forces from turbine first stage 6 during operation to protect outer rail element 134 from damage. Finally, gas path surface 143 includes a TBC coating (not separately labeled). A portion of aft face 144 is also provided with TBC coating.

Inner rail element 135 includes a first end 157 that extends to a second end 158 through an intermediate portion 159. Inner rail element 135 includes an outer surface 161, an inner or gas path surface 162, and an aft face 163. Outer surface 161 includes a mounting member 165 as well as an inner seal slot (not shown). Aft face 163 includes a plurality of openings 169 that are fluidly connected to the inner seal slot through a plurality of passages (also not shown). Aft face 163 is also provided with a wear strip 170. Gas path surface 162 and a portion of aft face 163 are provided with a TBC coating (not separately labeled). Outer rail element 134 is joined to inner rail element 135 by first and second side rail elements 178 and 179.

First side rail element 178 includes a first end 181 that joins with first end 138 of outer rail element 134 and a second end 182 that joins with first end 157 of inner rail element 135. An intermediate portion 183 extends between first and second ends 181 and 182 of first side rail element 178. First side rail element 178 also includes an outer surface 185, an inner or gas path surface 186, and an aft face 187. Gas path surface 186 and aft face 187 are provided with TBC coatings 189 and 190 respectively. In addition, outer surface 185 is provided with a channel 192. Channel 192 registers with channel 130 on second rail member 107 to form a seal cavity 194. In accordance with an aspect of the exemplary embodiment, first side rail element 178 is spaced from second side rail member 107 to form a coolant channel 197.

Second side rail element 179 includes a first end 204 that joins with second end 139 of outer rail member 134 and a second end 205 that joins with second end 158 of inner rail member 135. An intermediate portion 206 extends between first and second ends 204 and 205 of second side rail element 179. Second side rail element 179 also includes an outer surface 208, an inner or gas path surface 209, and an aft face 210. Gas path surface 209 and aft face 210 are provided with TBC coatings (not separately labeled). As shown, outer rail element 134, inner rail element 135, and first and second side rail elements 178 and 179 combine to form an opening 213. Opening 213 provides a passage for combustion gasses to pass from transition piece 24 to turbine first stage 6.

In accordance with an exemplary embodiment, turbomachine 2 is provided with a seal assembly 218 (FIG. 1) that substantially limits compressor gases entering the gas path through an interface (not separately labeled) between aft frames 36, 46 and turbine first stage 6. Seal assembly 218 includes a first seal component 223 (FIG. 3), a second seal component 225 (FIG. 4), and a third seal component (not shown). First seal component 223 sits in outer seal slot 70 to seal between outer rail member 54 and turbine first stage 6. Second seal component 225 is positioned in seal cavity 194 to seal between second side rail member 107 and first side rail element 178. Finally, the third seal component sits in the inner seal slot (not shown) to seal between inner rail member 55 and turbine first stage 6. At this point it should be understood that the number of seal components can vary depending upon the number of combustors and transition pieces associated with turbomachine 2. In addition, it should be understood that the third seal component (not shown) is generally similar to first seal component 223.

Figure 5:
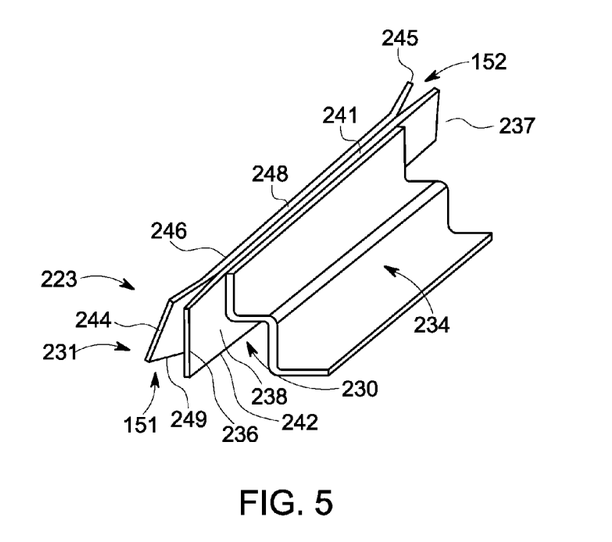
FIG. 5 is a perspective view of a first seal component of the transition piece seal assembly of FIG. 1.

As best shown in FIGS. 3 and 5, first seal component 223 includes a first seal member 230 operatively connected to a second seal member 231. First seal member 230 is also mounted to a bracket 234. Bracket 234 supports first seal component 223 to turbine first stage 6. First seal member 230 includes a first end 236 that extends to a second end 237 through a substantially linear intermediate portion 238. Intermediate portion 238 includes a first edge 241 and an opposing second edge 242. Second seal member 231 includes a first end portion 244 that extends to a second end portion 245 through an intermediate section 246. Intermediate section 246 includes a first edge portion 248 that is joined to first edge 241 of first seal member 230 and a second edge portion 249. First end 236 of first seal member 230 and first end portion 244 of second seal member 231 define a split zone 151. Similarly, second end 237 of first seal member 230, and second end portion 245 of second seal member 231 define a split zone 152. Split zones 151 and 152 allow second seal component 225 to be inserted into seal cavity 194 subsequent to installation of first seal component 223. The third seal component (not shown) may not include similar split zones. In addition, second seal member 231 is spaced from first seal member 230 so as to define a coolant passage 254 within outer seal slot 70. Coolant passage 254 guides coolant between first and second seal members 230 and 231.

Figure 6:
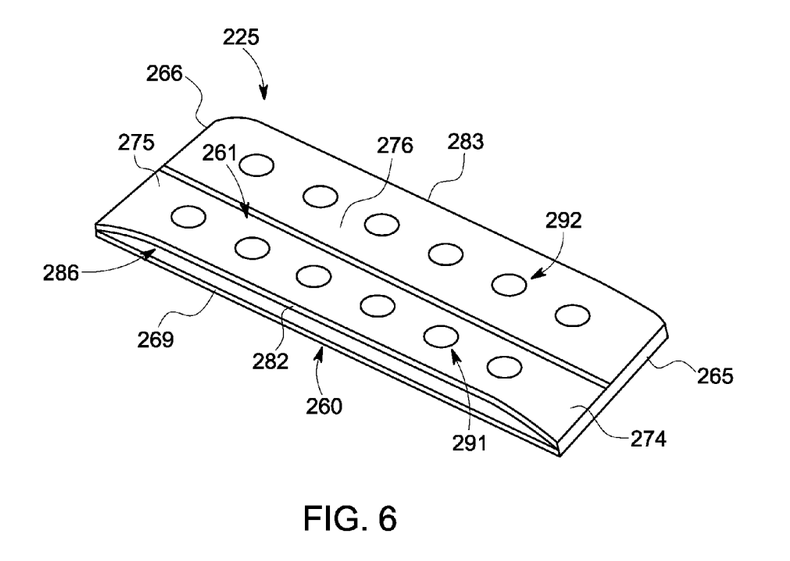
FIG. 6 is a perspective view of a second seal component of the transition piece seal assembly of FIG. 1.
Figure 7:
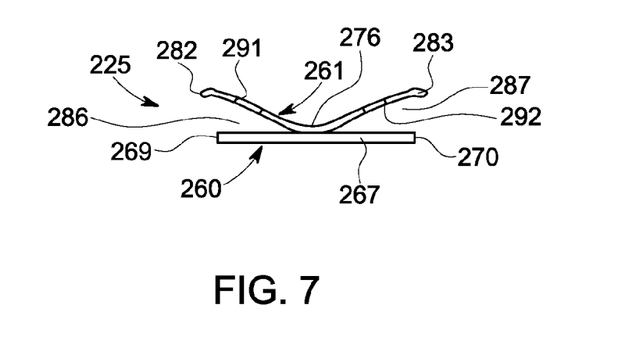
FIG. 7 is a cross-sectional view of the second seal component of FIG. 6.

As shown in FIGS. 4, 6, and 7, second seal component 225 includes a first seal element 260 joined to a second seal element 261. First seal element 260 includes a first end 265 that extends to a second end 266 through a substantially linear intermediate portion 267. Intermediate portion 267 includes a first edge 269 and an opposing second edge 270. Second seal element 261 includes a first end section 274 that extends to a second end section 275 through a generally curvilinear intermediate section 276. Intermediate section 276 includes a first edge section 282 and an opposing second edge section 283. Intermediate section 276 is joined to intermediate portion 267 such that first edge section 282 is spaced from first edge 269 to define a first coolant zone 286, and second edge section 283 is spaced from second edge 270 to form a second coolant zone 287. First coolant zone 286 is fluidly connected with coolant passage 254 (FIG. 3) and a coolant passage (not shown) of third seal component (also not shown). Second coolant zone 287 is fluidly connected to coolant cavities associated with a seal component on aft frame 46.

In further accordance with the exemplary embodiment, second seal element 261 is provided with a first plurality of openings 291 that extend along first edge section 282 and a second plurality of openings 292 that extend along second edge section 283. Openings 291 and 292 allow coolant to pass from coolant channel 197 into first and second coolant zones 286 and 287. More specifically, coolant flows through coolant channel 197 into seal cavity 194. The coolant passes through openings 291 and 292 into first and second coolant zones 286 and 287. The coolant flows from coolant zone 286 into upper coolant passage 254 and a lower coolant passage (not shown). The coolant then passes through channel 73 and is discharged through openings 72 into outer shroud member 8. Coolant also flows from the lower coolant passage through openings 97 to inner shroud member 10. In this manner, the coolant is not discharged and lost into the hot gases, but rather is employed to condition various components of turbine portion 4. Moreover, the exemplary embodiments allow coolant to flow through the side rails, and the upper and lower rails before being passed into a shroud portion (not separately labeled) of turbine first stage 6. In this manner, the coolant is actually used multiple times before being discharges from turbomachine 2. Reducing coolant loss into the hot gas path and using the coolant to condition multiple components leads to enhanced turbomachine efficiency.

Figure 8:
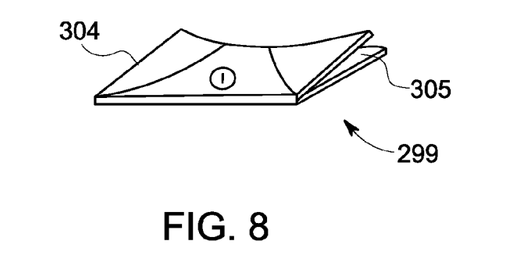
FIG. 8 is a perspective view of a cap member in accordance with an aspect of the exemplary embodiment.
Figure 11:
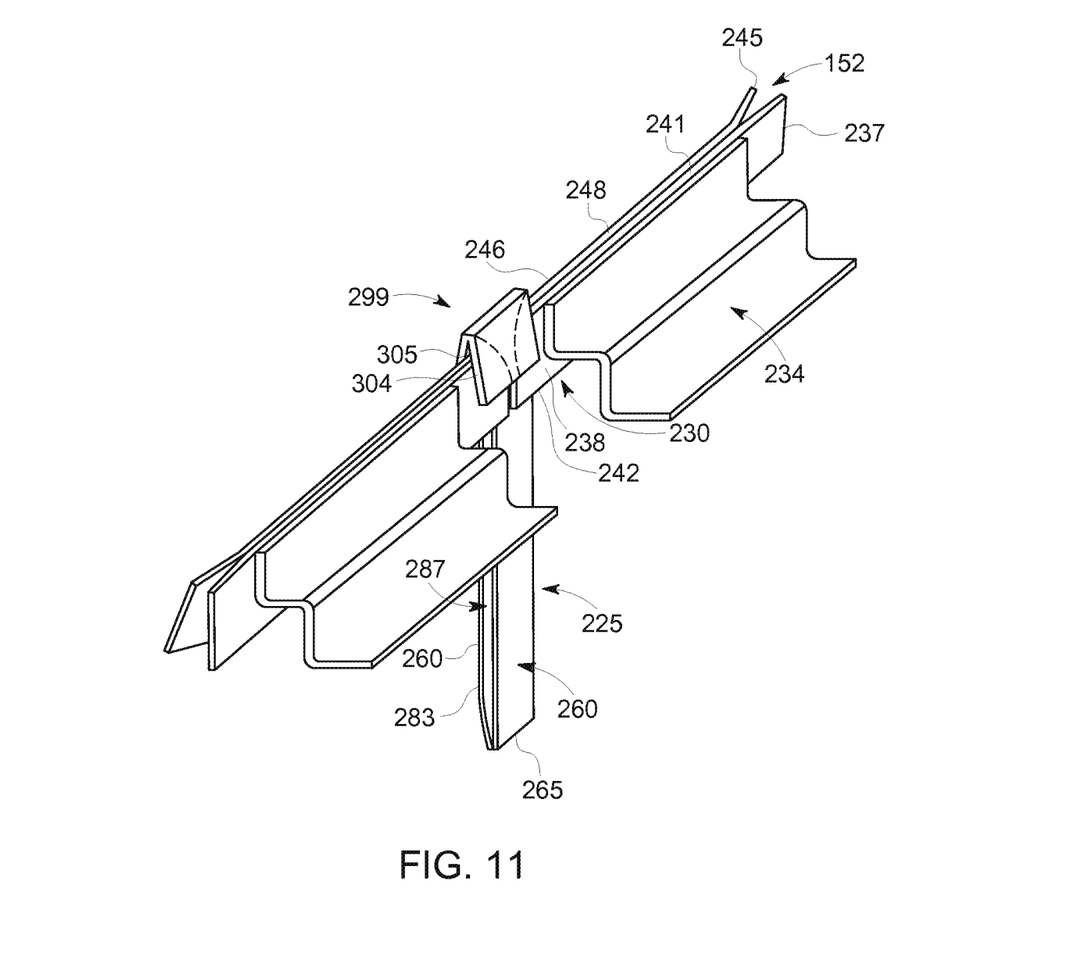
FIG. 11 depicts the first seal component of FIG. 5 joined to an adjacent seal component with the cap member of FIG. 8 and the second seal component of FIG. 6 inter-engaging with the first seal component and the adjacent seal component, in accordance with an exemplary embodiment.

In still further accordance with the exemplary embodiment illustrated in FIG. 11, seal assembly 218 is assembled by installing first seal component 223 into outer seal slot 70 and the third seal component (not shown) into the inner seal slot (also not shown). At this point, second seal component is passed through split zone 152 and a split zone (not separately labeled) formed in an adjacent first seal component (also not separately labeled) and into seal cavity 194. Once in position, a cap member such as shown at 299 in FIG. 8, is positioned across split zone 152 and the adjacent split zone. Cap member 299 includes first and second grip portions 304 and 305 that close split zone 152 and the adjacent split zone (not shown) to limit any leakage from seal assembly 218.

Figure 9:
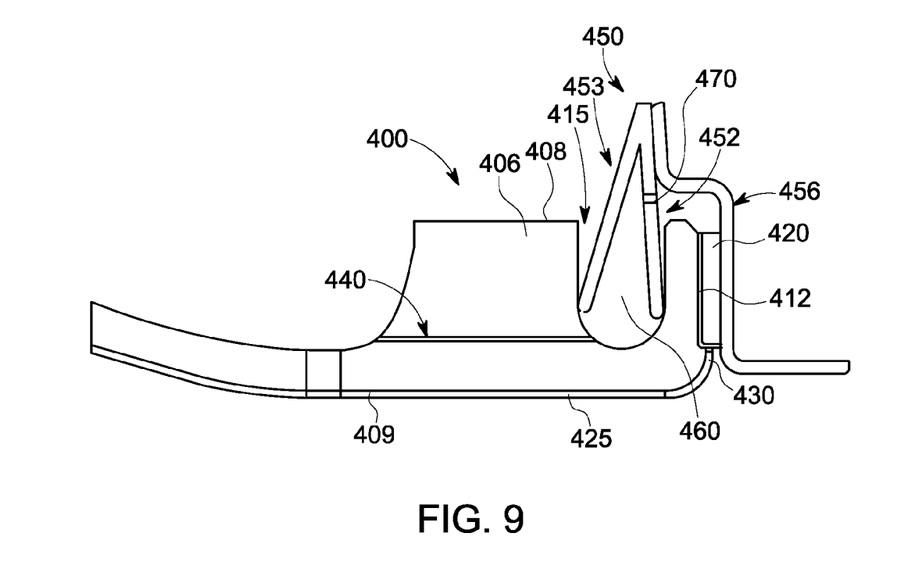
FIG. 9 is a plan view of an outer rail member of the first transition piece aft frame portion of FIG. 2 in accordance with another aspect of the exemplary embodiment.

FIG. 9 illustrates an outer rail member 400 in accordance with another aspect of the exemplary embodiment. Outer rail member 400 includes an intermediate portion 406 an outer surface 408 and an inner or gas path surface 409 that is exposed to hot gases flowing from a combustor assembly (not shown). Outer rail member 400 is also shown to include an aft face 412. Aft face 412 is positioned adjacent turbine first stage 6. Outer surface 408 includes an outer seal slot 415. Aft face 412 includes a sacrificial wear strip 420 that absorbs contacts from turbine first stage 6 to protect outer rail member 400 from damage. Finally, gas path surface 409 includes a thermal barrier ceramic (TBC) coating 425. A portion of aft face 412 is also provided with a TBC coating 430. TBC coating provides a thermal protective layer to transition piece surface exposed to hot combustion gases. Finally, outer rail member 400 is shown to include a frame cooling hole or passage 440 having a defined size that leads from outer seal slot 415.

In addition, outer rail member 400 is shown to include a seal component 450 having a first seal member 452 operatively connected to a second seal member 453. First seal member 452 is also mounted to a bracket 456. Bracket 456 supports seal component 450 to turbine first stage 6. In a manner similar to that described above, second seal member 453 is spaced from first seal member 452 so as to define a coolant passage 460 within outer seal slot 415. Coolant passage 460 receives extraction air flow through passage 440. In the exemplary embodiment shown, second seal member 453 includes a cooling passage 470 having a defined dimension that allows cooling air to flow from coolant passage 460. At this point it should be understood that the size of passage 440 and the dimension of cooling passage 470 can be varied depending on a desired pressure drop within coolant passage 460. It should also be understood that the number of passages 440 and cooling passages 470 can vary. In accordance with the exemplary embodiment, passage 440 provides convective cooling to aft face 412. In addition, by guiding coolant through cooling passage 470 eliminates the need to form openings in aft face 412. The elimination of openings in aft face 412 reduces stress concentration points that may adversely affect TBC coating 430.

Figure 10:
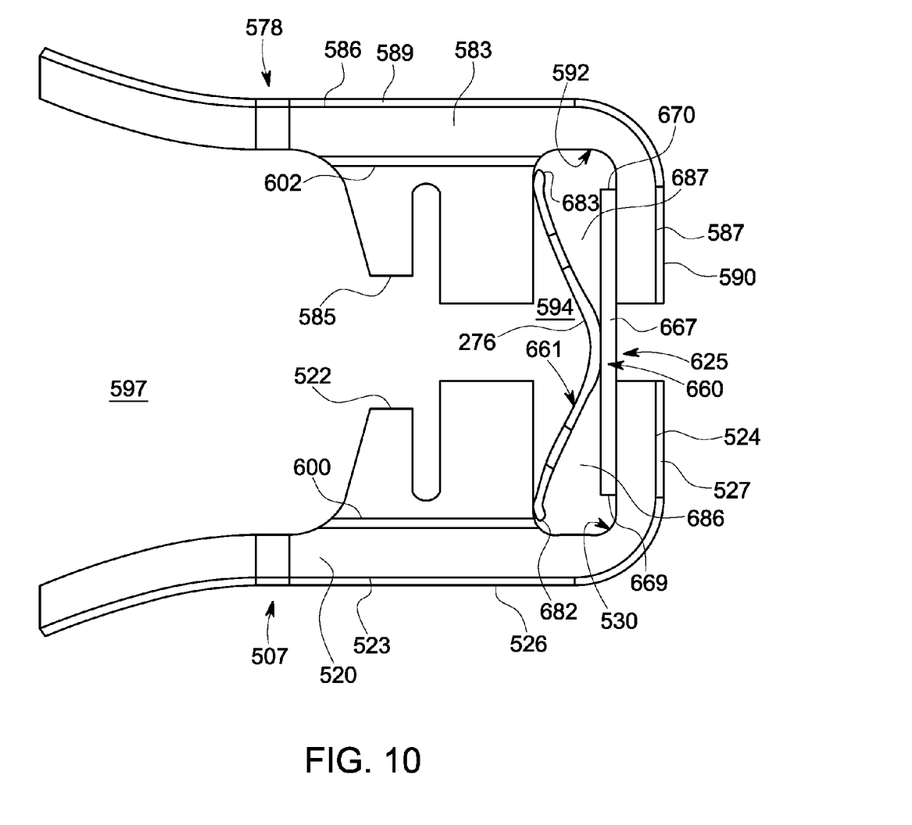
FIG. 10 is a plan view of a side rail member and a side rail element of the first and second aft frame portions of FIG. 2 in accordance with another aspect of the exemplary embodiment.

Reference will now be made to FIG. 10 in describing a second side rail member 507 includes an intermediate portion 520. Second side rail member 507 also includes an outer surface 522, an inner or gas path surface 523, and an aft face 524. Gas path surface 523 and aft face 524 are shown to include corresponding TBC coatings 526 and 527. In accordance with an exemplary embodiment, outer surface 522 is provided with a channel 530. A first side rail element 578 is arranged adjacent to second side rail member 507. First side rail element 578 includes an intermediate portion 583. First side rail element 578 also includes an outer surface 585, an inner or gas path surface 586, and an aft face 587. Gas path surface 586 and aft face 587 are provided with TBC coatings 589 and 590 respectively. In addition, outer surface 585 is provided with a channel 592. Channel 592 registers with channel 530 on second rail member 507 to form a seal cavity 594. In accordance with an aspect of the exemplary embodiment, first side rail element 578 is spaced from second side rail member 507 to form a coolant channel 597. In accordance with the exemplary embodiment, second side rail member 507 includes a first passage 600 that extends from channel 530 to coolant channel 597. Similarly, first side rail element 578 includes a second passage 602 that extends between channel 592 and coolant channel 597. The number and size passage 600 and 602 can vary.

A second seal component 625 is positioned in seal cavity 594 to seal between second side rail member 507 and first side rail element 578. Second seal component 625 includes a first seal element 660 joined to a second seal element 661. First seal element 660 includes a substantially linear intermediate portion 667. Intermediate portion 667 includes a first edge 669 and an opposing second edge 670. Second seal element 661 includes a generally curvilinear intermediate section 676. Intermediate section 676 includes a first edge section 682 and an opposing second edge section 683. Intermediate section 676 is joined to intermediate portion 667 such that first edge section 682 is spaced from first edge 669 to define a first coolant zone 686, and second edge section 683 is spaced from second edge 670 to form a second coolant zone 687. First coolant zone 686 is fluidly connected with coolant passage 460 and a coolant passage (not shown) of third seal component (also not shown). Second coolant zone 687 is fluidly connected to coolant cavities associated with a seal component on aft frame 46. In addition, first coolant zone 686 and second coolant zone 687 are fluidly connected to coolant channel 597 through passages 600 and 602 respectively. Passages 600 and 602 are sized to provide a desired pressure drop within first and second coolant zones 686 and 687 to establish a desired inner and outer rail member cooling.

At this point it should be understood that the exemplary embodiments provide a seal assembly that limits leakage of compressor gases into an interface zone between a transition piece and a turbine first stage. In addition to reducing leakage, the seal assembly channels cooling flow through the interface zone into turbine components. That is, in contrast to prior art systems in which any coolant passed onto the seals is dumped into the gas path to mix with hot gases flowing through the turbine portion, the exemplary embodiment channels the coolant into turbine components. In this manner, the coolant is used to condition multiple turbine components and thus continues to have a positive impact on turbine performance instead of being lost into the hot gases. The continued use of the coolant leads to enhancements in turbomachine efficiency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A transition piece seal assembly comprising:
    a first seal having a first end, a second end, and an intermediate portion extending therebetween, the intermediate portion including a first edge and an opposing second edge; and
    a second seal joined to the first seal, the second seal being spaced from the first seal to define a coolant passage, the second seal including a first end portion, a second end portion and an intermediate portion extending therebetween, the intermediate portion having a first edge portion and an opposing second edge portion, the first end and first end portion defining a split zone receptive of a third seal.

2. The transition piece seal assembly according to claim 1, further comprising: a bracket member operatively connected to the first end of the first seal member.

3. A transition piece seal assembly comprising:
    a first seal component including a first seal member joined to a second seal member, the first seal member including a first end that extends to a second end through a substantially linear intermediate portion having a first edge that extends to a second edge, the second seal member including a first end portion that extends to a second end portion through a substantially linear intermediate section having a first edge portion that extends to a second edge portion, the first end and the first end portion defining a split zone the first edge portion being joined to the first edge of the first seal member, the second seal member being spaced from the first seal member to define a coolant passage; and
    a second seal component including a first seal element joined to a second seal element, the first seal element including a first end that extends to a second end through a substantially linear intermediate portion having a first edge that extends to a second edge, the second seal element including a first end section that extends to a second end section through a substantially curvilinear intermediate section that is joined to the intermediate portion of the first seal element, the second seal being received between the first end and the first end portion at the split zone of the first seal.

4. The transition piece seal assembly according to claim 3, further comprising: a cap member configured to join the first seal component with the second seal component.

5. The transition piece seal assembly according to claim 3, wherein first edge section of the second seal element is spaced from the first edge of the first seal element to define a first coolant zone, and the second edge section of the second seal element is spaced from the second edge of the first seal element to define a second coolant zone, one of the first and second coolant zones being fluidly connected to the coolant passage.

6. The transition piece seal according to claim 5, wherein the second seal element includes a first plurality of openings extending along the substantially curvilinear intermediate portion adjacent to the first edge section, and a second plurality of openings extending along the substantially curvilinear intermediate portion adjacent to the second edge section.

7. A turbomachine comprising:
a turbine portion mechanically linked to the turbine portion;
a first transition piece fluidly connected to the turbine portion, the first transition piece including an aft frame having an outer rail member, an inner rail member and first and second side rail members joining the outer and inner rail members;
a second transition piece fluidly connected to the turbine portion adjacent to the first transition piece, the second transition piece including an aft frame having an outer rail element, an inner rail element, and first and second side rail elements joining the outer and inner rail elements, the first side rail element being joined to the second side rail member so as to establish a seal cavity;
a first seal component operatively connected between the turbine portion and the outer rail member, the first seal component including a first seal member joined to a second seal member, the first seal member including a first end that extends to a second end through a substantially linear intermediate portion having a first edge that extends to a second edge, the second seal member including a first end portion that extends to a second end portion through a substantially linear intermediate section having a first edge portion that extends to a second edge portion, the first edge portion being joined to the first edge of the first seal member, the first end and the first end portion defining a split zone the second seal member being spaced from the first seal member to define a coolant passage; and a second seal component arranged within the seal cavity, the second seal component including a first seal element joined to a second seal element, the first seal element including a first end that extends to a second end through a substantially linear intermediate portion having a first edge that extends to a second edge, the second seal element including a first end section that extends to a second end section through a substantially curvilinear intermediate section that is joined to the intermediate portion of the first seal element, the second seal being captured between the first end and the first end portion at the split zone.

8. The turbomachine according to claim 7, wherein each of the outer and inner rail member includes a gas path surface configured and disposed to be exposed to hot gases, and an aft face extending substantially perpendicularly from the gas path surface, the gas path surface being provides with a thermal barrier coating (TBC) layer.

9. The turbomachine according to claim 8, wherein the aft face is provided with a wear strip.

10. The turbomachine according to claim 8, further comprising: at least one channel extending through each of the outer and inner rail members towards the turbine portion, the at least one channel fluidly interconnecting the coolant passage with a turbine component.

11. The turbomachine according to claim 7, wherein each of first and second side rail members includes a gas path surface section configured and disposed to be exposed to hot gases, and an aft face section extending substantially perpendicularly from the gas path surface section, the gas path surface section being provided with a thermal barrier coating (TBC) layer.

12. The turbomachine according to claim 11, wherein the aft face section is provided with a TBC layer.

13. The turbomachine according to claim 7, further comprising: a coolant channel extending between the first side real element and the second side rail member, the coolant channel being fluidly connected to the seal cavity.

14. The turbomachine according to claim 7, wherein the first end section of the second seal element is spaced from the first edge of the first seal element to define a first coolant zone, and the second edge section of the second seal element is spaced from the second edge of the first seal element to define a second coolant zone, one of the first and second coolant zones being fluidly connected to the coolant passage.

15. The turbomachine according to claim 14, wherein the second seal element includes a first plurality of openings extending along the substantially curvilinear intermediate portion adjacent to the first end section, and a second plurality of openings extending along the substantially curvilinear intermediate portion adjacent to the second edge section.

* * * * *